United States Patent
Mashinsky

(10) Patent No.: US 6,188,756 B1
(45) Date of Patent: Feb. 13, 2001

(54) EFFICIENT COMMUNICATION THROUGH NETWORKS

(76) Inventor: Alexander Mashinsky, 205 E. 95th St. Apt. 34K, New York, NY (US) 10028

( * ) Notice: Under 35 U.S.C. 154(b), the term of this patent shall be extended for 0 days.

(21) Appl. No.: 08/727,681

(22) Filed: Oct. 8, 1996

Related U.S. Application Data

(63) Continuation-in-part of application No. 08/320,269, filed on Oct. 11, 1994, now abandoned.

(30) Foreign Application Priority Data

Oct. 11, 1995 (IL) ........................................ 115580

(51) Int. Cl.⁷ ..................................................... H04M 3/42
(52) U.S. Cl. ............................................. 379/207; 379/220
(58) Field of Search ..................................... 379/114, 115, 379/126, 127, 142, 201, 202, 203, 204, 205, 206, 207, 210, 219, 220, 222, 229, 350

(56) References Cited

U.S. PATENT DOCUMENTS

| | | |
|---|---|---|
| 4,068,101 | 1/1978 | Chemarin . |
| 4,166,929 | 9/1979 | Sheinbein ........................ 179/18 BG |
| 4,313,035 | 1/1982 | Jordan et al. ..................... 179/18 BE |
| 4,313,036 | 1/1982 | Jabara et al. . |
| 4,594,477 | 6/1986 | Noirot .............................. 179/18 AD |
| 5,012,515 | 4/1991 | McVitie .................................. 380/49 |
| 5,027,387 | 6/1991 | Moll . |
| 5,066,393 | 11/1991 | Sibbit et al. . |
| 5,163,042 | 11/1992 | Ochiai ..................................... 370/17 |
| 5,247,676 | 9/1993 | Ozur et al. ............................ 395/650 |
| 5,311,583 | 5/1994 | Friedes et al. ........................ 379/209 |
| 5,353,331 | 10/1994 | Emery et al. ........................... 379/58 |
| 5,408,518 | 4/1995 | Yunoki . |
| 5,408,526 | 4/1995 | McFarland et al. . |
| 5,414,752 | 5/1995 | Jonsson . |
| 5,425,084 | 6/1995 | Brinskele . |
| 5,425,091 | 6/1995 | Josephs . |
| 5,438,616 | 8/1995 | Peoples . |
| 5,479,495 | 12/1995 | Blumhardt ........................... 379/207 |
| 5,506,887 | 4/1996 | Emery et al. ........................... 379/58 |
| 5,515,425 | 5/1996 | Penzias et al. . |
| 5,526,413 | 6/1996 | Cheston, III et al. ............... 379/201 |
| 5,533,100 | * 7/1996 | Bass et al. .............................. 379/67 |
| 5,606,602 | 2/1997 | Johnson et al. ...................... 379/115 |
| 5,608,782 | 3/1997 | Carlsen et al. ......................... 379/63 |
| 5,608,786 | 3/1997 | Gordon ................................. 379/100 |
| 5,661,790 | * 8/1997 | Hsu ...................................... 379/209 |
| 5,675,636 | 10/1997 | Gray ...................................... 379/114 |
| 5,706,507 | 1/1998 | Schloss ................................. 395/615 |
| 5,764,741 | 6/1998 | Barak ..................................... 379/114 |
| 5,771,279 | 6/1998 | Cheston, III et al. ............ 379/93.17 |
| 5,790,642 | 8/1998 | Taylor et al. ......................... 379/112 |
| 5,825,858 | 10/1998 | Shaffer et al. ....................... 379/120 |
| 5,970,126 | 10/1999 | Bowater et al. . |

FOREIGN PATENT DOCUMENTS

0501903 A1 * 9/1992 (EP) .
0658061A2 * 6/1995 (EP) .
2316266A * 2/1998 (GB) .

(List continued on next page.)

OTHER PUBLICATIONS

Book Review, Impact Of Liberalization On Resale And Callback, Telecommunications Policy, vol. 21, No. 3, pp. 275–276 (1997).*

(List continued on next page.)

*Primary Examiner*—Scott L. Weaver

(57) ABSTRACT

A method and device that interrogates the availability of a called party before placing a communication from the calling party to the called party. A callback may be initiated so that both communications are completed simultaneously. The routing of communication may take place through any one of a number of different networks and at another time of the day, even if the caller does not otherwise have access to those networks.

16 Claims, 8 Drawing Sheets

FOREIGN PATENT DOCUMENTS

| | | | |
|---|---|---|---|
| WO 92/01350 | 1/1992 | (WO) | |
| 9316544 | 8/1993 | (WO) | H04M/3/42 |
| WO 93/16543 | 8/1993 | (WO) | |
| WO 93/16546 | 8/1993 | (WO) | |
| WO 94/28683 | 12/1994 | (WO) | |

OTHER PUBLICATIONS

Brennan, Industry Parallel Interconnection Agreements, Information Economics and Policy vol. 9, No. 2, pp. 133–149 (1997).*

Globerman et al., Competition In Public Long–distance Telephone Markets In Canada, Telecommunications Policy, vol. 17, No. 4, pp. 297–312 (1993).*

Tao et al., "Internet Access via Baseband and Broadband ISDN Gateways", Dec. 4, 1994, (IEEE).

"Survey: Telecoms", in *The Economist*, vol. 344, No. 8034 (Sep. 13, 1997), pp 56/1–56/34.

"Auctioning Telephone Calls", in *The Economist*, vol. 344, No. 8032 (Aug. 30, 1997), pp 47–48.

R. Frieden, "Chapter 9: The International Telecommunications Toll Revenue Division Process", in *International Telecommunications Handbook* (1996), pp 133–148, Artech House.

Y. Levy, S. Durinovic–Johri, and R.A. Milito, "Dynamic Network Call Distribution with Periodic Updates", in *Teletrafic Science and Engineering*, vol. 1a (J. Labetoulle, and J.W. Roberts, ed.)(1994), Elsevier.

Raif O. Onvural, *Asynchronous Transfer Mode Networks: Performance Issues* (1994), Section 6.3–6.4, Artech House.

B. Yuhas & N Ansari ed., *Nueral Networks in Telecommunications* (1994), Chapter 1, Kluwer.

R. Frieden, "International Toll Revenue Division: Tackling the Inequities and Inefficiencies", in *Telecommunications Policy*, vol. 17 No. 3 (Apr. 1993), pp 221–133, Butterworth-–Heinemann.

R.J. Horrocks & R.W.A. Scarr, "Chapter 24: Tariff Principles", in *Future Trends in Telecommunications,* 1993, pp. 387–392, J. Whitaker & Sons.

K. Cheong & M. Mullins, "International Telephone Service Imbalances: Accounting Rates and Regulatory Policy", Telecommunications Policy, vol. 15, No. 2 (Apr. 1991), pp. 107–118.

R.M.Frieden, "Accounting Rates: The Business of International Telecommunications and the Incentive to Cheat", 43 Federal Communications L.J. 111 (1991).

K.B. Stanley, "Balance of Payments, Deficits, and Subsidies in International Communications Services: A New Challenge to Regulation", in 43 Administrative Law Review 411 (Summer 1991).*

N.F. Maxemchuk & M. El Zarki, "Routing and Flow Control in High–Speed Wide–Area Networks", in *Proceedings of the IEEE*, vol. 78, No. 1 (Jan. 1990), pp. 204–221, IEEE.*

B. Warfield & P. Sember, "Prospects for the Use of Artificial Intelligence in Real–Time Network Traffic Management", in *Computer Networks and ISDN Systems,* vol. 20, (1990), pp. 163–169, Elsevier Science.*

A. Girard, *Routing and Dimensioning in Circuit–Switched Networks,* (1990), Addison–Wesly, (Table of Contents only).*

J. Potvin, & S.F. Smith, "Flexible Systems for the Design of Heuristic Algorithms in Complex or Domains", in Impact of Recent Computer Advances on Operations Research (1989), pp. 332–344, Elsevier Science.*

G.L. Schultz & R.R. Meyer, "A Flexible Parallel Algorithm for Block–Constrained Optimization Problems", in *Impact of Recent Computer Advances on Operations Research* (1989), pp. 82–91.*

M. Schwartz, *Telecommunication Networks* (1987), Sec.6–2, Addison–Wesley.*

* cited by examiner

EFFICIENT COMMUNICATION THROUGH NETWORKS

CROSS-REFERENCE TO COPENDING PATENT APPLICATIONS

This is a continuation-in-part of U.S. patent application Ser. No. 08/320,269, filed Oct. 11, 1994, now abandoned.

FIELD OF THE INVENTION

The present invention relates to a system for providing transparent access to different types of communication networks that may be incompatible with each other and some of which may be incompatible with the equipment used by the calling party or the called party, least cost routing in such a system, maintaining quality of communication in such a system, prioritizing the routing of such communications, evaluating different communication access locations to determine where to send a communication, synchronizing communications, blocking incoming communications while waiting for the synchronizing to be completed, and minimizing the cost of communications using such a system. This system also monitors and records the services used on each of the unrelated service providers. This information is then utilized for billing purposes and for paying the service providers.

BACKGROUND OF THE INVENTION

Presently when communication services are offered on a global basis, communications are established through the equipment of a plurality of service providers located in various countries. This communication is dominated by large carriers which have formed the global network through reciprocal agreements. Smaller competing carriers, who may offer the same service at lower prices, currently do not have reciprocal agreements between them.

The invention provides these smaller competing carriers with access to each other without the use of the large carriers. Such access provides the calling party (e.g., a subscriber of the smaller competing carrier) with the option of obtaining optimum service at lower prices while ensuring that the appropriate service providers get paid. The calling party can now have cheaper access to different types of telecommunication networks that the party may not have access to under the current large carrier system. It may be cheaper or preferred for the calling party to use smaller carriers to communicate with another location by routing the communication over a digital data network rather than an analog voice network, or by routing the communication over a paging network rather than a cellular network or a combination of networks.

SUMMARY OF THE INVENTION

One objective of the invention is to provide communication between otherwise incompatible communication networks in a manner that is transparent to the calling party (that is, the subscriber of the service initiating the communication), while assuring that each service provider that renders service in routing that communication gets paid. Preferably, the communication is routed based on the results from an evaluation of all available communication networks even though the calling party may have direct access to only one type of communication network.

In accordance with the invention, control information in the form of an inquiry of the availability status of the party to be called may be sent through different networks by routing it through a control location of the inventive system that converts it into a compatible form. For instance, the called party may be using one type of network, such as a data network having E-mail, while the calling party is using another, such as a cellular network.

With a conventional data network, sending an E-mail message to an address on the data network does not indicate the availability of a party on a cellular network to communicate. In accordance with one embodiment of the invention, however, the control location of the inventive system is connected with both the data network and the cellular network to convert the control information associated with E-mail into a form compatible on the cellular network for making an inquiry and then transmits the inquiry over the cellular network.

The inventive system may have external or internal software and hardware that intercepts the normal transmission to route it appropriately. The system effects further routing, which may include converting between different forms of communication networks, compressing voice into data packets or decompressing data packets into voice, coding and decoding transmissions for security reasons, and multiplexing communications over the same lines. The system records the various routing transactions involved in the communication and calculates the billing of the transactions in a manner that is transparent to the calling party.

Another objective of the invention is to interrogate the called party number's communication availability prior to conferencing the calling party and called party. The inventive system may have a control location that receives both a calling party and a called party access number or identification. After receiving these access numbers, the system initiates an inquiry to the called party from the control location and waits for a status signal as to the called party location's availability to take incoming calls. If the status signal indicates an available status, a first communication is initiated to the called party access number from the control location and a second communication is initiated to the calling party access number from the control location. Thereafter, the first and second communications are bridged using the same or different networks.

In addition to interrogating the called party's availability status, the control location determines where to route the call by examining factors such as transmission cost, the appropriate network for the desired transmission, the service provider that provides this kind of network and the plurality of available called party locations that service the called party access number. The control location also considers communication networks that are available to the called party locations and the identity of service providers who provide those communication networks across the various called party locations. After receiving the calling party and called party access numbers, the control location performs an inquiry as to which service provider and which network can route the transmission.

In addition to technological considerations, the control location also studies the various cost to perform the desired transmission and records such information for both monitoring and billing purposes. An authorizer uses such information to monitor all incoming and outgoing transactions between the network service providers and provide clearance insuring payment and settlement of all transaction for each of these operators.

In routing communications, the control location takes into consideration customer defined preference criteria relating to preferences for particular types of communication network, transmission quality, cost, security, and priority of transmission. For example, if the quality of a transmission is not acceptable, the transmissions may be rerouted to any other available network that can transmit with better quality, thereby ensuring that the quality of the transmission satisfies the customer's preference criteria for transmission quality. The calling party access number itself may include a message or protocol containing preference criteria selections.

Another objective of the invention involves synchronizing the completion of callback from the control location to the calling party and called party legs of communication. The synchronization involves the calculation of the waiting time that is necessary before the control location commences each callback. The waiting time may be fixed or read from memory off a data base located at the control location. This synchronization may result in completion of both communications simultaneously or with minimal delay, i.e., a significantly shorter delay than without the synchronization. Such synchronization results in more efficient use of the network at a lower cost.

While the control location is waiting to initiate completion of one of the callback legs of communication, an incoming communication may block the completion of that one leg and thereby interrupt the synchronization from taking place. The blocking period may be for a fixed time period or may be based on information in a data base that includes information relating to the expected waiting time for completing communications.

In accordance with all embodiments of the invention, the communication being established may be two-way.

BRIEF DESCRIPTION OF THE DRAWING

For a better understanding of the present invention, reference is made to the following description and accompanying drawing, while the scope of the invention is set forth in the appended claims.

DESCRIPTION OF THE PREFERRED EMBODIMENT

Figure 1:
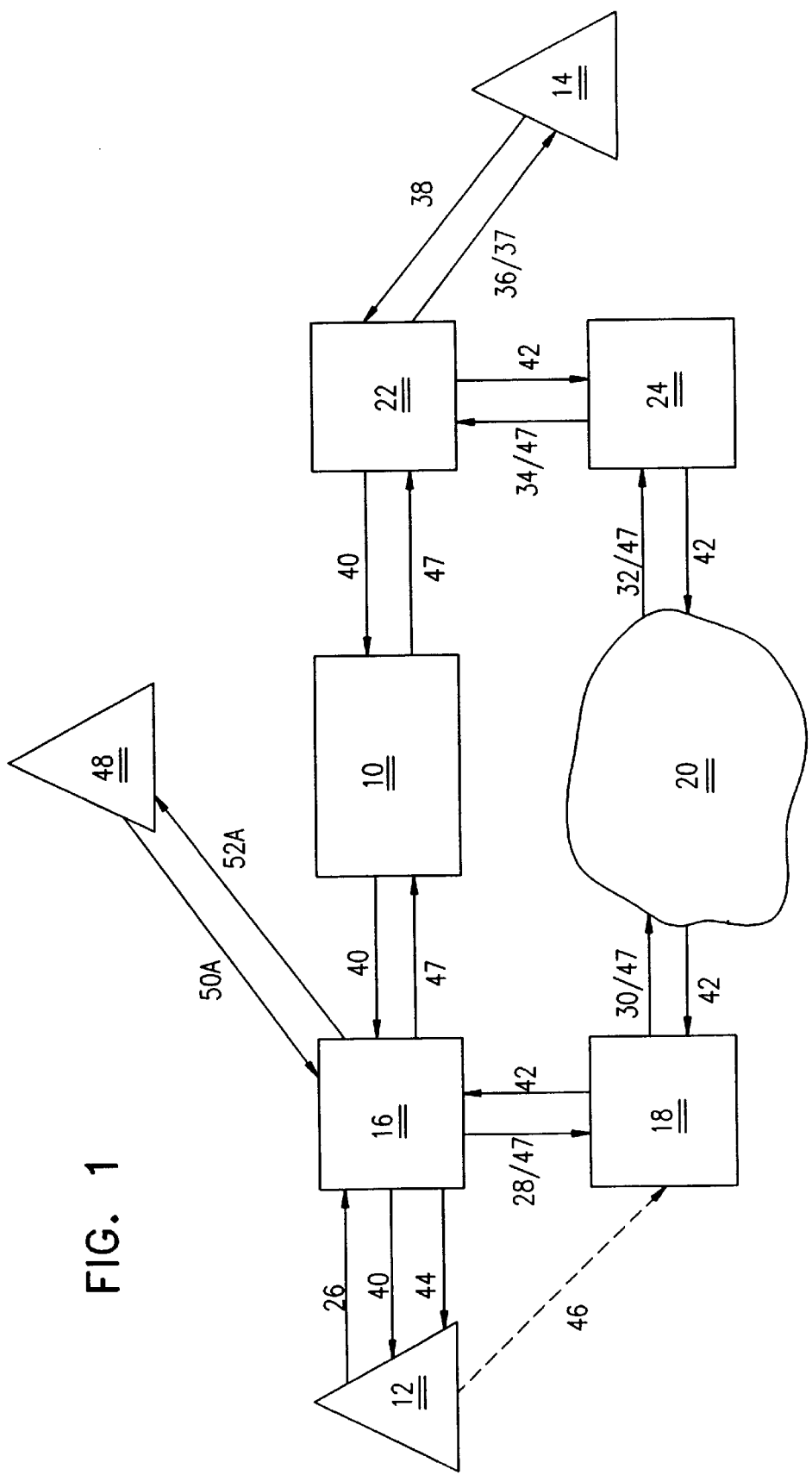
FIG. 1 is a conceptual block diagram indicating the principles of operation of the inventive method to interrogate over a data network and transmit voice over the data network.

Turning to FIG. 1, a schematic drawing depicting a method of sending a voice or digital transmission to a local node is shown. For ease in understanding, this drawing is the same as FIG. 1 of the copending U.S. patent application Ser. No. 08/320,269 (the '269 application), filed Oct. 11, 1994 by the present inventor and entitled METHOD OF AND SYSTEM FOR EFFICIENT USE OF TELECOMMUNICATION NETWORKS (as amended), whose contents are incorporated herein by reference.

The '269 application describes a technique by which hotels, and other similarly situated establishments, can make use of international callback technology. The reference numbers in FIG. 1 of the '269 application are the same as those in FIG. 1 of the present application, i.e., a telecommunications network 10, calling location 12, called location 14, transparent telecommunications node or intercept 16, first central local node 18, data network 20, central office 22, second central local node 24, phonecall 26, link 28 to central local node 18, link 30 to the external channel 20, link 32 to the second central local node 24, line 36 over which a first phonecall 27 is made to interrogate the called location 14 and over which is sent back a call supervision status signal 38, a callback 40, an uncompleted call signal 42, a message 44, a reverse answer supervision signal 47 and a calling location 48 that places a call 50A or receives a callback 52A.

The calling location 12 may be where a data transmission originates or where a voice communication originates for eventual receipt by the calling location 14. While phonecalls are certainly one form of communication envisioned, the invention covers any type of communication, whether it involves public service telephone networks, cellular networks, paging networks, data networks, analog networks, etc. A call is to be interpreted as any form of communication over a network and not limited just to voice phonecalls.

While such a technique is particularly suited to callback situations that employ a voice network, it is also applicable to employing digital data based networks such as the internet computer network. For instance, instead of routing a call direct between locations A and B using technology X, it may be cheaper to use callbacks from location C to location A and from location C to location B using technology Y.

As used in this application, the term "calling party" designates the initiator of the transmission or communication, which may include callers over phone networks, subscribers that use data, cellular or paging networks, etc. The term "called party" designates the ultimate receiver of the transmission or communication from the calling party and with whom communication is being effected. The called party may include users of phone networks, cellular networks, paging networks, data networks, etc. whose access device on the network serve as the destination to which the transmission or communication is directed from the calling party.

In addition to transmitting voice through the telecommunication network 10, the voice may be converted into digital form in a conventional manner, e.g., compressed into data packets or sampled. At the first central local node 18, the call from the calling location 12 is converted to a data signal which is then sent over a data network such as the data network 20 to the called location or destination 14. Prior to reaching the called party, the data signal is reconverted into voice at the central office 22 (or control location) to be transmitted to the destination 14 via a public communications network or other connection line 36. Such a transaction bypasses the use of the international telephone networks and utilizes local calls instead. All internode connections are via the data network.

In addition, by transmitting voice over a data network, the need for callback over a telephone network to save costs is obviated. Since data transmissions are virtually instantaneous, the costs associated with the waiting times for transmitting voice over conventional phone networks is avoided and even the costs associated with waiting times for making connection in a callback over a conventional phone network are avoided.

Each node is capable of communicating with other nodes for purposes of routing the communication and act as a transit node, making inquiries to determine availability of the party at the destination to receive the communication, and even tracking down which network the party is presently accessing so that the communication may be routed there. For instance, a node at the called party may be preprogrammed with all different forms of communication networks and contact identifications that the party may be accessing, together with their addresses, access numbers, or other types of identification information to access them from the node.

Upon receipt of a request inquiring as to the availability of the party to receive a communication, the node at the called party having the main identification or number associated with the called party checks the status of each of these communication networks at different access locations to determine whether any are being accessed by the party at that time. In this connection, the called party would have previously designated the main identifications (addresses, etc.) or phone numbers where it wants to be reached and what networks are to be employed.

For instance, the check may reveal that the called party's computer is logged in or that the phone is hooked up, etc. If so, then the node has identified where the party may be accessed and then contacts the inquiring node to forward an authorization code for billing credit purposes so that the called party node may effect communication through this identified communication network. The authorization code limits the duration and services that may be provided. Alternatively, the system may send the authorization code together with the inquiry.

The node that made the inquiry request sends the authorization code after checking in with a central node responsible for clearing all transactions and which registers every event on the network. The central node may be part of a distributed network of central nodes that are responsible for billing. After the called party node receives the authorization code and authenticates it for billing purposes, communication may be established to the party through the identified communication network that was tracked down and found to be accessible all transparent to the end user. An appropriate signal is transmitted to the requesting node that communication may commence between the parties.

An example of tracking down the called party will now be described. Assume that the party spends half the year in North America using NACN cellular network and the remainder in Europe using GSM internet network hookup using Laptop computer. Under normal situations, these two forms of networks are not compatible so direct communication is not possible. However, in accordance with the invention, such a situation is rectified by communicating with a node that is programmed with information as to which of the possible networks the party may be using. If the node is in contact with the NACN system, it is also in contact with a node that is in contact with the GSM system. Both nodes check their respective cellular systems to locate on which the party is or has been accessing or which has been turned off. Once the accessible location is identified, contact can be made from regular telephone to the laptop converting and routing the voice over data to the laptop on which it is converted back into voice.

As an example of operation, the subscriber of the service provider first contacts a central local node by providing the calling party's identity access number or identification and the called party access number or identification, as well as the type of service desired as concerns routing preferences, service providers, level of transmission quality, timing of transmission, etc.

The central local node polls the called party nodes to locate the network which the called party is accessing. For instance, one called party node may be programmed with access information on all the possible networks that the called party may be using, e.g., cellular, computer, paging, etc. This called party node then searches to find where the called party is or is likely to be and then informs the central local node that the communication may be sent to it upon receipt of an authorization number for the transaction.

The central local node provides such authorization, perhaps after checking with the central node first that handles billing and determining that the calling party or service providers satisfy financial conditions for permitting service and future settlement. If the central local nodes do a least cost routing analysis, for instance, and determine that a callback from the called party is the cheaper way to complete the transaction and both the calling party's service provider and called party's service provider has received authorization, then the originating service provider will be billed. The central node records all such transactions for billing purposes.

One application of the invention that allows the Internet or other data network to function like a telephone and fax machine will now be explained. Callers are allowed to dial anywhere in the world for the price of a local access and service fee and avoid using long distance carriers. Users may make such calls to have voice conversations and to send faxes to remote locations. For making voice calls, a local system is dialed via computer access or regular phone which prompts the users for the called party number or identification and then connects them to the called party over the Internet or other data network, such as by connecting them via a node through a local call or through other networks. For example, a calling party may access a node that converts the transmission into data to support the network that it chooses. For instance, it may connect to another node that converts the transmission into voice and then connects the communication into a local call to the called party with the called party node being operated by an independent service provider located elsewhere such as in another country. Of course, the connection takes place only after authorization is received to complete the local call.

For sending faxes, the calling party sends a fax into a central local node and the fax is then forwarded to the called party over the Internet or other data network. The fax may be sent in real time or as a store and a forward mode for later sending as part of a subsequent batch transmission, depending upon the preferences of the calling party.

The present invention envisions the option of using a single communication device, such as a multimedia laptop computer, to initiate and receive all forms of communication by contacting a node or being contacted by a node in accordance with the invention and providing it with an identification access address and a called party access address, phone number or other type of identity code and any preferences concerning the transmission, such as level of quality of transmission, service providers, time of cost, transmission (e.g., real time or store and forward later), security, encryption, etc.

Transparent to the calling party that is using the laptop, the node takes care of all further action such as tracking down the called party, handling financial billing and obtaining authorization for completing transactions via individual remote service providers, determining the preferred path to route communications even if over otherwise incompatible networks by converting the transmissions accordingly, checking the level of quality of transmission and making sure the transmission satisfies preferences.

In addition to having access to a data network, the laptop may have appropriate software/hardware that give it access to a cellular digital packet data and, via a built-in fax modem, to a phone network. Thus, the laptop may be in contact with the node through any of these different communication networks and communicate over any of these communication networks as well, including performing two way voice calls.

Other applications of the invention concern transmissions through conventional switched frame relay, conventional switched asynchronous transfer mode and other conventional data networks such as the Internet. Frame relay is an international standard for efficiently handling high-speed data over wide area networks that uses network bandwidth only when there is traffic to send. Asynchronous transfer mode allows users to combine voice, video and data on a single phone line and operates at up to Gigabyte-per-second speeds in which usable capacity is segmented into fixed-size cells each consisting of header and information fields allocated to services on demand. The Internet network differs from frame relay switching and asynchronous transfer mode by using transmission control protocol/Internet program, which is a set of protocols developed by the Department of Defense to link dissimilar computers across a variety of other networks and protocols.

Figure 2:
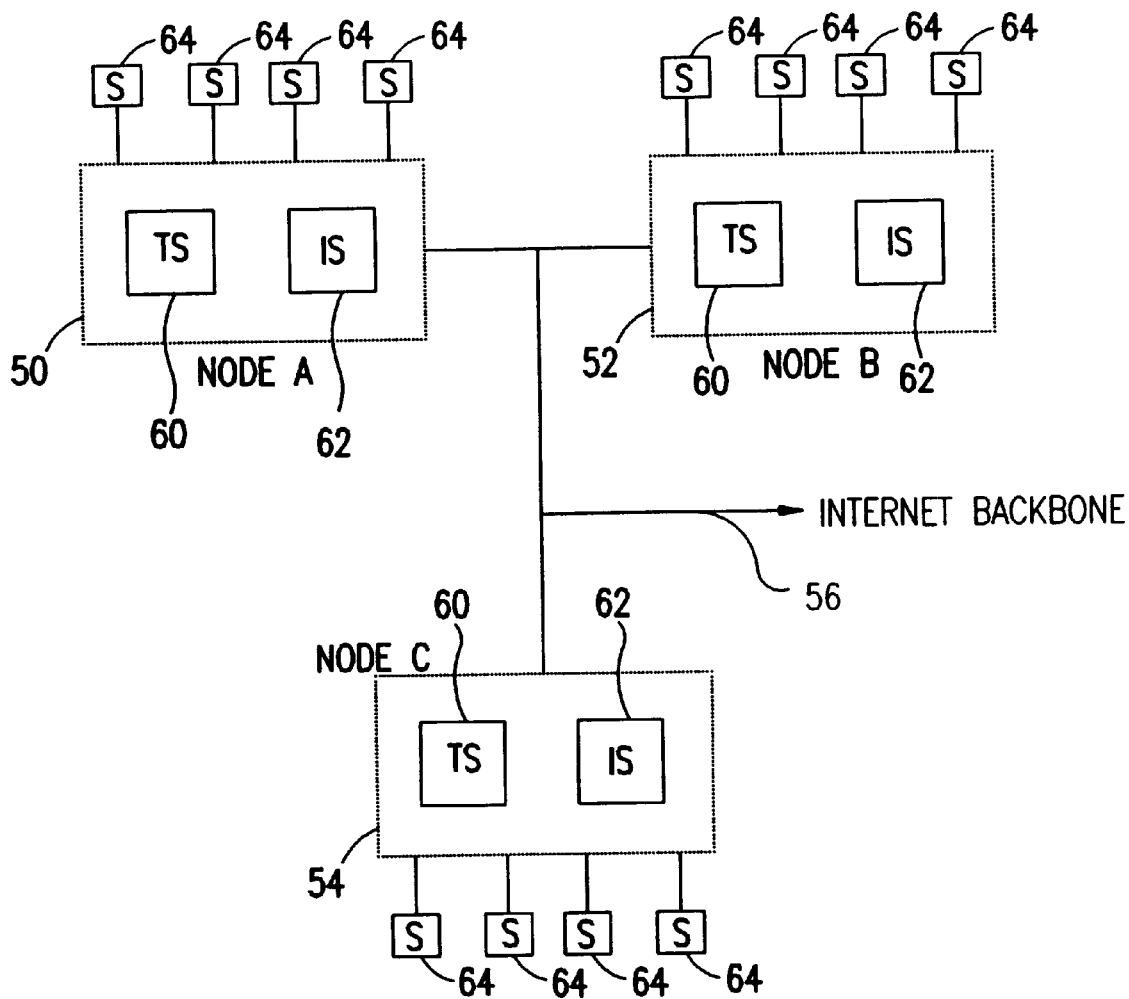
FIG. 2 is a schematic diagram of a system overview having two servers at nodes connected to an Internet backbone.

Referring to FIG. 2, several remote nodes 50, 52, 54 are shown on the Internet backbone 56. Each remote node has a telephone server 60 and an Internet server 62, although a common server may be used instead to provide both functions. The Internet server 62 has access to the Internet backbone 56. Both servers 60, 62 are networked using transmission control protocol/Internet program TCP/IP, which is a set of protocols that link dissimilar computers across a variety of other networks and protocols as conventionally used on local area networks, minicomputers and mainframes, or are networked with a router in the case of an ATM. Subscribers 64 dial into and are serviced by the telephone server 60, which is a computer based machine with conventional voice and fax processing hardware and software, so as to establish a connection with one of the remote nodes. Subscribers access the servers by using any of the conventional off-the-shelf phone and fax machines.

Figure 3:
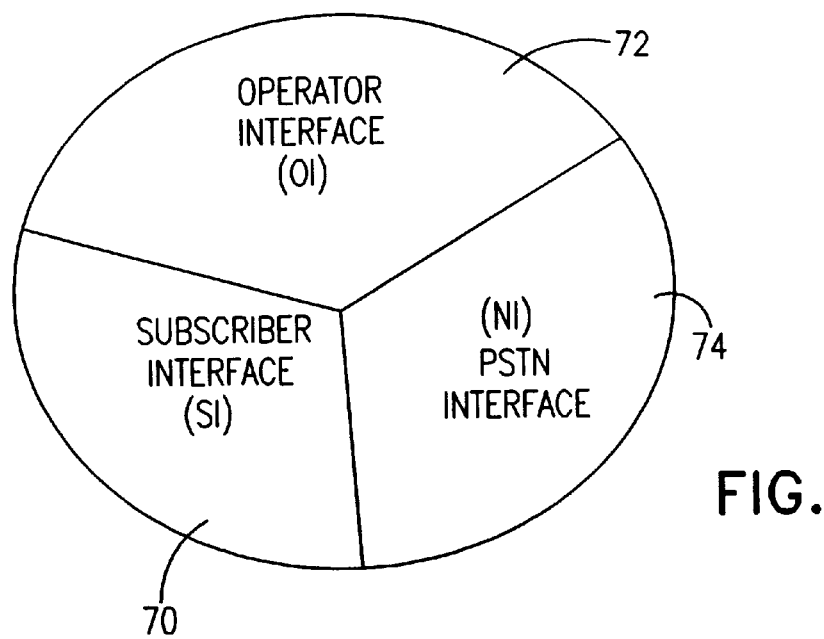
FIG. 3 is a schematic diagram of a telephony server.

Referring to FIG. 3, a calling party interface 70, operator interface 72 and a public switched telephone network PSTN interface 74 are shown. The subscriber interface 70 provides subscribers or calling parties with internet phone and fax service via the Internet Server 62 of the remote nodes (see FIG. 2). The calling party may dial into the subscriber interface 70 through voice or data lines, for instance, with a computer or laptop. The PSTN interface 74 has lines that are used for inbound calls and lines that are used for outbound calls. These lines for inbound calls lead to industry standard dialogic hardware or a modem such that when a particular number is called, the identification or password of the calling party is checked for validity of identity.

If determined to be valid, the calling party is requested to indicate what service is desired so that the communication may be routed accordingly over voice or data networks. The called party is contacted to determine availability for receiving the communication. If available, communication is established over the desired service. Otherwise, if real time communication is desired, the calling party is notified that contact is unavailable.

If store and forward is the desired method of communication, then the called party is monitored until contact becomes available, at which time the communication may be transmitted. A store and forward type communication is one in which a desired communication, such as a telecopier transmission, is stored until it may be sent in accordance with other criteria, such as in batch format at off peak rates.

Voice processing entails call processing and content processing. Call processing involves physically moving the call around such as through switching. Content processing involves actually interacting with the call's content, such as digitizing, storing, recognizing, compressing, multiplexing, editing or using it as input to a computer program.

The operator interface 72 includes designated representatives of the service provider to interact with the system by means of a personal computer console to perform essential functions such as subscriber administration, rate schedule management, billing and system administration. These functions are remotely accessible by dial up.

Figure 4:
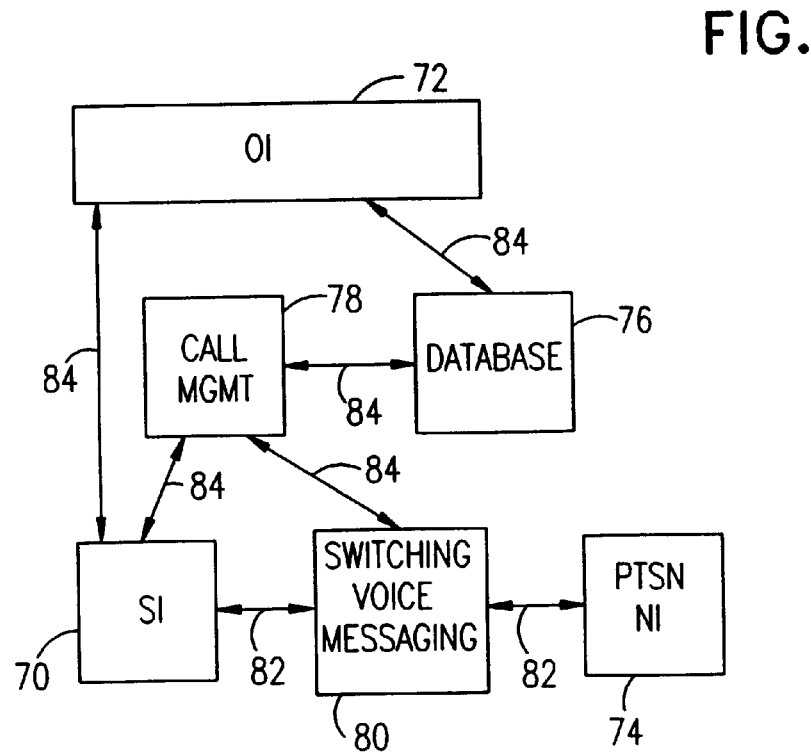
FIG. 4 is a functional block diagram of the embodiment of FIG. 2.

FIG. 4 shows the functional hardware in accordance with the invention. In addition to the previously mentioned fundamental external interfaces, the internal functional blocks that are necessary for the present invention include, as represented by blocks in the diagram, a data base 76, call management 78, switching, voice and fax messaging 80. The horizontal links 82 on either side of the switching and voice messaging block 80 are voice paths. The remaining links 84 are all data flow paths.

The data base 76 is a database management system that is used as a repository for subscriber information, rate schedules, call details, and configuration information required to operate the system and the franchise. Switching via block 80 is required to establish voice or fax between the source and the called party. Pre-recorded audio messages are played back onto a voice pathway by voice messaging for purposes of greeting, indicating normal call setup progress, and checking system load status, subscriber account status, and error calculations. Voice messaging refers to a small set of system wide messages and not to arbitrary voice mail messages.

Calls originating from the PSTN interface side are detected by the switching voice messaging block 80, which also communicates with call management 78 to establish a link with the called party node via the Internet server 62 of FIG. 2 or a voice or data line and to determine which message to playback if any. The call management 78 handles call set up requests from either the subscriber interface 70 side or PSTN interface 74 side to issue call set up commands to the subscriber interface 70 and to the switching voice messaging 80. It maintains status information on the subscriber interface and PSTN lines. The call management 78 is configurable to verify credit availability before setting up a call with other nodes if necessary, and monitor the call to issue voice messaging and call termination commands upon credit depletion. It handles call take down situations by recording call detail information in the database for eventual billing purposes and issuing relevant commands directly to subscriber interface 70.

For establishing a call, the following steps may take place:

The dialogic hardware answers the call. The switching voice messaging 80 sends a message to the answered call via the voice processing unit requesting entry of a called party access number, which after its entry is received and stored. The call management 78 checks the data base 76 for the user's billing status. If invalid, the voice processing unit plays a message and the call is disconnected. Otherwise, for valid callers, the call management 78 initiates the subscriber interface 70 to send a request packet over the Internet other data or voice line; the request packet consists of the called party number or identification and may include an authorization code.

Upon receipt of the packet at a remote central local node, the remote central local node will dial the called party number or enter its address, perform a call analysis and send the result back to the subscriber interface at the origination node. Call management 78 checks the analysis result. If a connection link was established, then the call begins. Otherwise, the switching voice messaging 80 prompts the user via the voice processing unit with a message and options, such as dial another number or leave a message in a voice mailbox. Upon completion of the call, billing information will be stored in the data base 76 for further processing by the operator interface 72.

Figure 5:
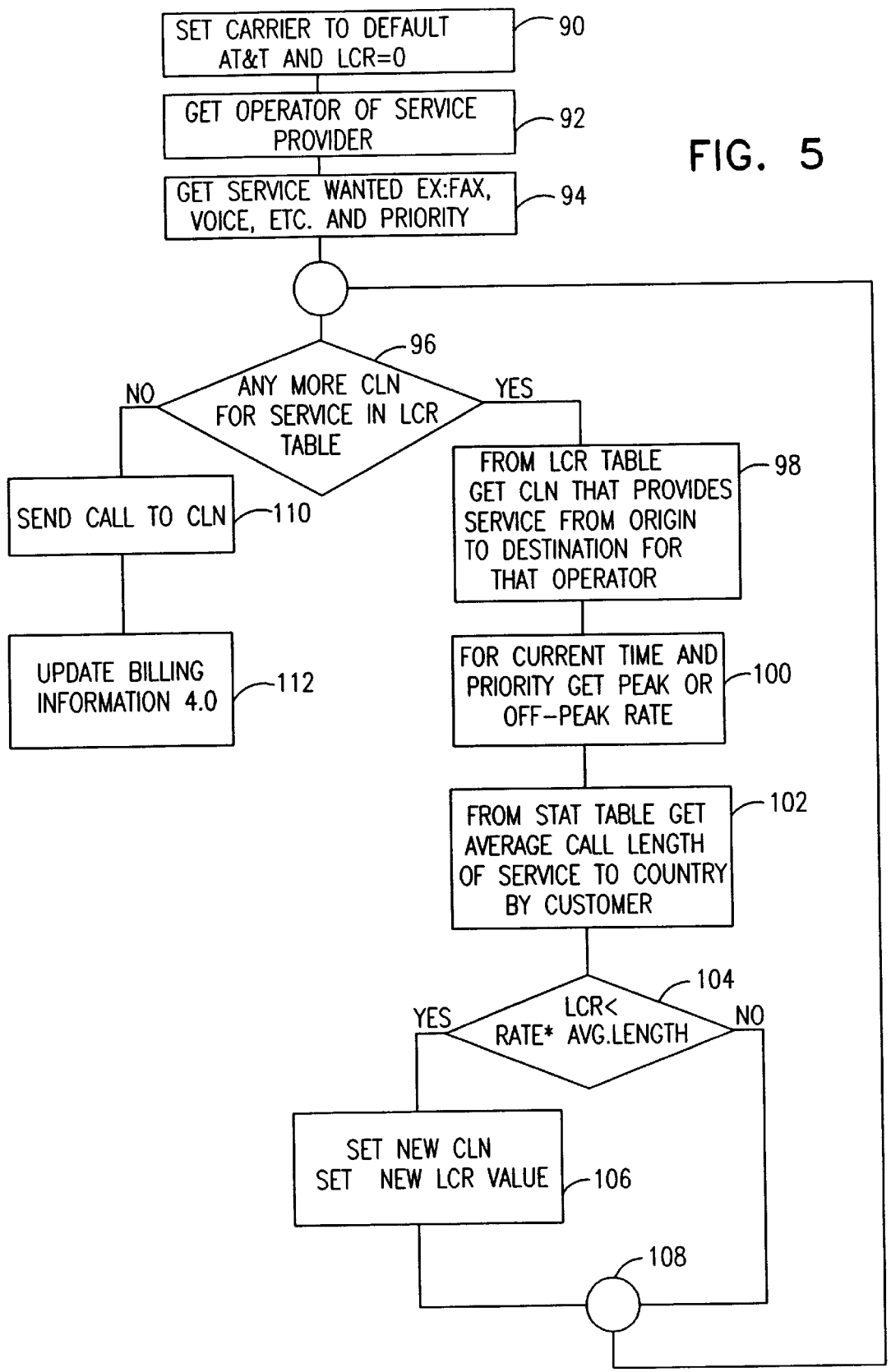
FIG. 5 is a schematic diagram of a flow chart showing routing for versatility and priority of transmission.

FIG. 5 illustrates a technique for gaining access to a greater number of telecommunication networks. The normal transmission from an access device is intercepted by an intercept device, which routes the transmission to a central local node. At the central local node, an investigation is made as to what route is available for the specific service.

After determining which route is available, the central local node determines all available nodes that can provide such a service for the called party end. The central local node then selects a specific available node based on considerations such as cost, line quality and security and priority. The central local node checks with an internal data base to determine the available networks at the called party end, the identity of the service providers who provide those networks across different nodes, and the different transmission costs associated with customer defined criteria. The network access devices supported at the called party end could be a telecopier, telex, voice telephone, cellular phone, radio phone, data entry terminal, etc. (different types of communication access devices). Transmission costs associated with customer defined criteria include customer preference for particular types of networks, encryption security, and/or priority of transmission such as transmit in real time or in a store and forward format as defined in the customer's message.

A software defined network may be used to maintain quality (e.g., upon detection of degradation in quality, the bandwidth of the transmission may be widened in accordance with or prioritization of transmission instructions). If data packets do not arrive quick enough, then quality may be enhanced by increasing the bandwidth within predetermined bandwidth parameters on account of other voice data users.

Another embodiment of the application of this invention concerns security. A calling party may prefer that the transmission take place over a secure, dedicated line, but does not care about the route taken by the acknowledgment or reply to the transmission. As a result, the acknowledgement or reply may be routing over non-dedicated lines and through any communication networks, even from among selected networks of the calling party's choosing. For instance, the calling party may want the acknowledgement or reply to be routed over either cellular or computer network services.

In accordance with the invention, such customer preferences may be found in the data base associated with the calling party and interpreted by the central local nodes. The central local nodes then instruct nodes responsible for the routing back of the reply or acknowledgement to follow the desired preference.

Another example of the application of this invention relates to a customer's preference that a telecopier message be transmitted immediately instead of in delayed batch format or vice versa. The telecopier message is sent to a central local node (at the origin). After initializing the system, i.e., setting a carrier default 90, checking customer preferences for an operator of a service provider 92 and checking customer preference for selecting the desired service 94, the central local node determines 96 if there are any more central local nodes (CLN) from a least cost routing (LCR) table, which contains a list of central local nodes connected with service providers of different networks and their costs for providing service.

If there are more central local nodes, the next one is selected 98. A determination 100 is made as to whether peak or off peak rates apply by basing it on the current time. Reference to a data base table 102 may be made to determine the average call length of service to the location by the customer to help figure out the most cost efficient route based on history of usage. A least cost routing comparison 104 is made to determine whether the new central local node's connection to the service provider offers the more favorable rate based on the average length of communication that what was being offered through the previously considered central local node. If better, the newly considered central local node (and its associated service provider) is selected. If worse, the previously selected central local node (and its associated service provider) will remain selected.

This process is repeated 108 for each central local node and thereby each service provider. When done, the format of the call, the appropriate service provider, network and time of day are selected for sending the transmission to the selected central local node 110 and the billing information is updated 112.

By selecting the appropriate network, it may be ascertained that it is less expensive to transmit the telecopier message in digital form over a data network than to transmit the telecopier message in voice callback format through the long distance carriers. Thus, the data network may be the network of choice for purposes of selecting the least cost between nodes. On the other hand, the central local node should give priority to the customer's preferences, which could mean that the transmission be routed through the most secure route which may not be the data network. Instead, a secure transmission would be through a different routing and would result in an increase in transmission cost.

Figure 6:
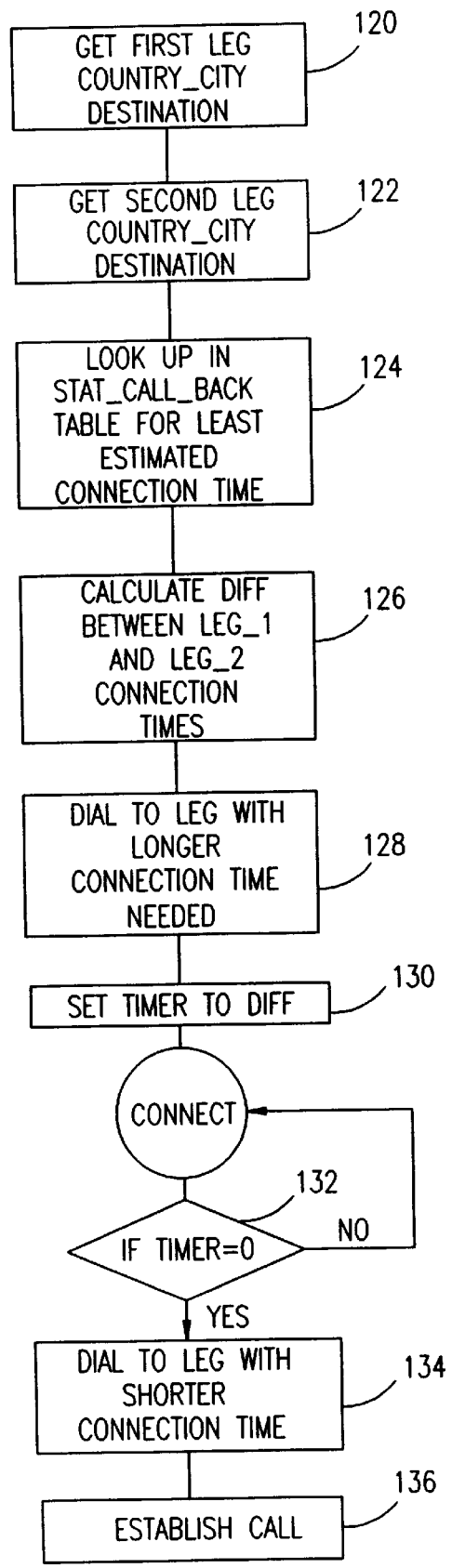
FIG. 6 is a schematic diagram of a flow chart showing synchronizing connection.

FIG. 6 shows a flow chart for establishing a synchronized connection of both call legs, that is, synchronizing the completion of callback and called party communications by selecting specific system time and speed of callback time. A user is allowed to stay on a line or hang up to wait for a callback while the routing unit time the completion of both communications from the routing unit to the calling party access number and the called party access number and ensures that both occur simultaneously or according to cost efficiency of transaction. The routing unit checks an internal data base to determine how long to wait before commencement of opening communications with both so as to ensure synchronization of the callback and called party calls. This may be based on the historical performance of placing the callback and called party calls or placing a data call or tracking down a party.

A routing unit initially receives the first leg 120 (location, city, destination) of the calling party and the second leg 122 (location, city, destination) of the called party and then looks up in a status call back table in memory 124 for the least estimated connection time. The difference 126 is calculated between the connection times of the two legs and the leg with the longer connection time needed is dialed 128. A timer 130 is set to the difference and counts down to zero 132.

When the counting down is completed, the timer triggers the actuation to open communication with the leg with the shorter connection time 134 to establish the call 136. If a called party is to be called that is not found in the status call back table in memory 124, then the actuation to open communication takes place in the sequence of the called party leg first and then the other leg. The average connection times are then stored in the table in memory 124 for future synchronization of the two legs. The table is continuously updated every time calls are placed. The average connection times for both legs and the service providers that are available for connection to the called party location and city codes are stored in the table for retrieval upon demand.

Another aspect of the invention concerns blocking the channels so no other incoming calls can interrupt during the time the routing unit performs the callback and called party calls. The intercept unit only releases the blocked channel a few seconds before the time specified in the history of completion of the callback and called party calls. Alternatively, the time delay may be based on a fixed minimum time period common for placing those types of calls. For instance, if a long distance call takes 10 to 15 seconds depending upon the called party, the time delay period that is set could always be 9 or 10 seconds under the time required to make that call. Thus, there is only a short time period during which an incoming call can interrupt the routing unit's synchronization of the completion of the callback and called party calls. It should be noted that the data base checked by the intercept unit may not be the same data base checked by the routing unit, although their contents could be the same. Such call blocking features are commercially available from VoiceSmart in software and hardware under the designation transparent local node (TLN) and hotel local node (HLN). By blocking such incoming calls, service providers no longer face the risk of bearing the expense of completing the second callback leg if the first callback leg becomes busy due to an incoming call.

FIGS. 7A–7G exemplify different techniques for efficient routing communications in accordance with the invention. Access devices 150 and 156 (FIGS. 7A–7G) and nodes 152 (FIGS. 7A–7C, 7E–7F), 154 (FIGS. 7A–7G) and 160 (FIG. 7C) on a network are shown, but each node may be located in the same or different geographical region or country. The access device 150 may have an intercept capability to render the ensuing routing connections transparent to the users. Node 158 (FIG. 7B) represents an access device on a different network. For purposes of example, links 170 (FIGS. 7A–7G) and 174 (FIGS. 7A–7G) may be considered voice transmission lines and links 172 (FIGS. 7A–7C, 7F) and 173 (FIG. 7D) may be considered data transmission lines. Link 176 (FIG. 7B) may be a paging or cellular line. Links 178 (FIGS. 7E and 7G) and 180 (FIG. 7E) may be data lines. Links 182, 184 and 186 (FIG. 7F) may also be data lines. Each node may perform the function of terminating the call, such as when authorization is not forthcoming for carrying out the transaction.

Figure 7A:
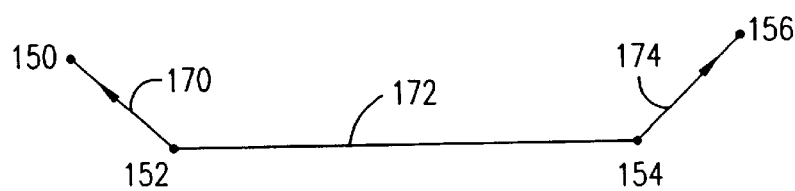
FIGS. 7A–7G are schematic diagrams showing different types of communication routing techniques.

FIG. 7A shows nodes 152 and 154 effecting communication with their respective access devices 150 and 156, as would be done for simultaneous callback. Initially, the initiator access device 150, transmits its identification and that of the other access device 156 to node 152. Node 152 requests node 154 to make an inquiry on the availability of access device 156. If available, then callback is made over respective links 170, 174, preferably for simultaneous communication. The two callbacks are bridged over link 172. Nodes 152 and 154 convert voice transmissions into data transmission and vice versa so that data transmissions travel between nodes 152 and 154 and voice transmissions travel from the access devices to the associated nodes 152, 154. Links 170, 172 and 174 may handle voice or data communications.

Figure 7B:
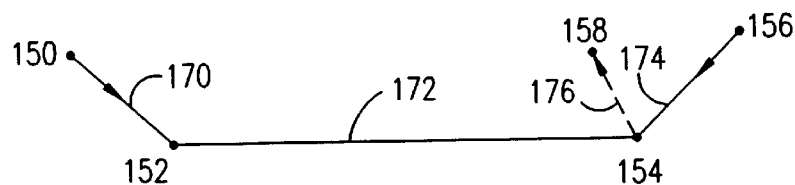

FIG. 7B works in the same way as in FIG. 7A, except that node 154 pages the called party via paging device 158 over paging network 176. Once paged, the called party calls node 154 through access device 156 and communication is established by bridging over link 172. During the interim between paging of the called party and the calling to the node 154 by the called party through the access device 154, the access device 150 may either be waiting for communication to be established with node 152 or be called back by node 152 after node 152 is advised that the access device 156 has contacted the node 154.

Figure 7C:
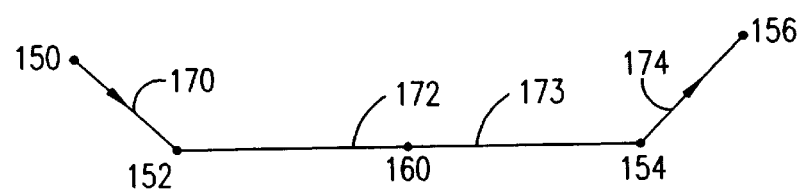

FIG. 7C is the same as that of FIG. 7A, except that an additional node 160 between nodes 152, 154 is shown to illustrate that the routing between nodes 152, 154 may not be direct, and also showing that access device 150 is communicating directly with node 152 rather than as a result of callback as in FIG. 7A and using two different data links 172 and 173.

Figure 7D:
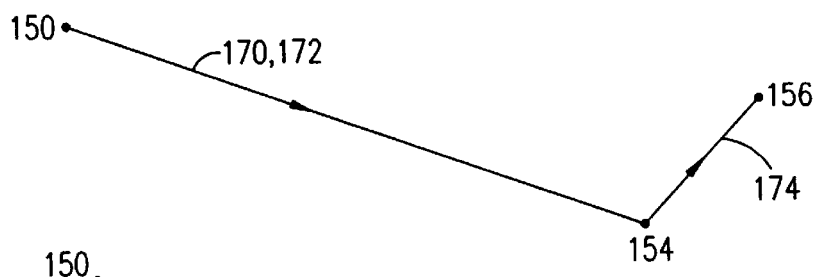

FIG. 7D shows that communication may be through a single node 154, rather than through two nodes as in FIGS. 7A–7C as in case where access device 150 is a computer that has direct access to data link 172.

Figure 7E:
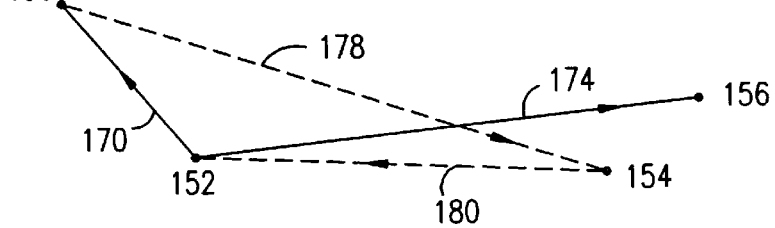

FIG. 7E shows also that communication may be through a single node 152, ratter than through two nodes, but also shows that such communication is established after access device 150 communications with node 154 say through E-mail that communication is desired with access device 156. Instead of routing the transmission through node 154, node 154 signals to node 152 to make contact with access devices 150 and 156 directly.

Figure 7F:
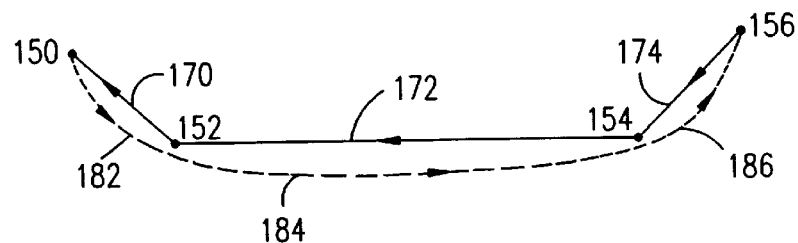

FIG. 7F shows a callback type of arrangement in which a request for establishing communication from access device 150 to access device 156 is made through one kind of network, but the actual callback is done over a different kind of network, although both kinds of networks share the same nodes 152, 154. As an example, the request could be through a data network 182, 184, 186 and the callback could be through two voice links 170, 174 from respective access devices 150, 156, with the two voice links being bridged by a data link 172. The nodes 152, 154 convert voice transmissions into data transmissions and vice versa as desired.

Figure 7G:
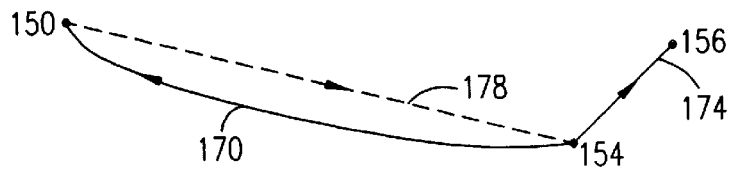

FIG. 7G is the same as FIG. 7E, except that node 154 also performs the function of node 152 in FIG. 7E and thereby routes the transmissions through itself. In this case, a request for establishing communication with access device 156 from access device 150 is effected over a data link 178, such as through E-mail. In response, node 154 calls both access devices 150, 156, preferably so that each is contacted simultaneously, over a different network such as over voice lines 170, 174.

In each of these examples of FIGS. 7A–7G, billing is handled transparent to the parties using the access devices

150, 156. Each of the nodes are in contact with a central node (or network of central nodes) that must clear the transaction before the termination nodes take action through a global authorizer. Once the transaction cleared, an authorization code is provided to the node. The authorization code may either be forwarded to some other node at the time a request is made to establish communication or may be in response for such from that other node.

The central node, which includes the global authorizer, would check the total open credit or debit for the originating node, check for patterns of fraud, check for rights to terminate communication early based on available credit, and check the calling party credit standings with third parties. Based on the results of such checking, the global authorizer of the central node either approves or disapproves of the proposed transaction. Once the transaction is complete, the node responsible communicates such completion to the central node, which then updates account information accordingly. If a node is being shut down, the central node also communicates such shutdown to all other nodes so that they remove the shutdown node from the stored routing table of available nodes.

Figure 8:
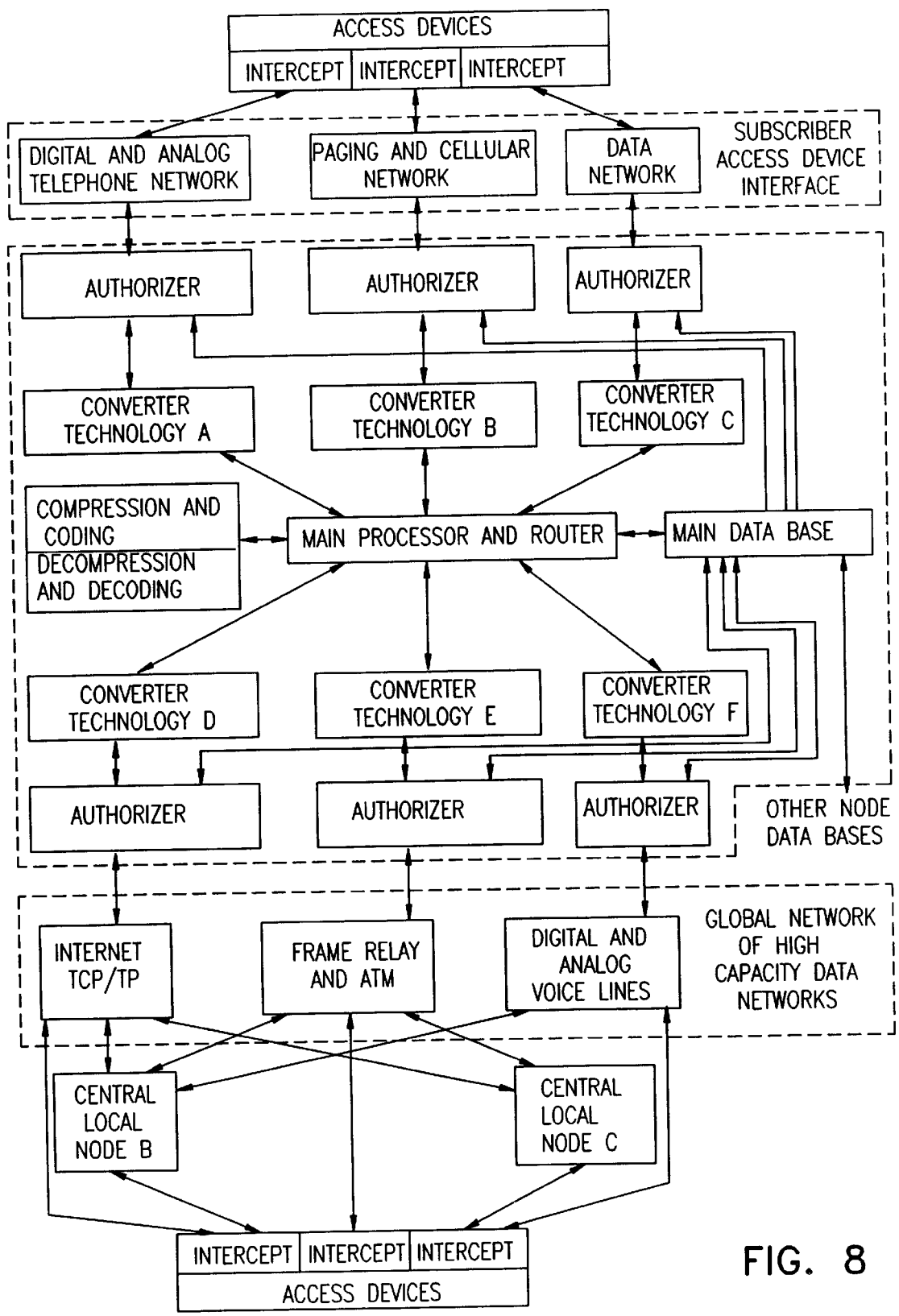
FIG. 8 is a schematic representation of a central local node interacting with networks in accordance with the invention.

FIG. 8 shows a central local node A interacting with a calling party access device interface and a global network of high capacity data networks. Access devices may communicate with central local nodes directly or through intercept devices which direct the communication to the central local node. Access devices are exemplified by telephones, pagers, cellular phones, laptops, facsimile machines, multimedia computer workstations, etc.

The subscriber access device interface includes communication networks such as digital and analog telephone, paging and cellular, and data. The central local node includes an authorizer, converters for each communication network, a main processor and router, a main data base, compression and coding system and decompressing and decoding system. The global networks of high capacity data networks include the internet, frame relay and digital and analog voice lines.

The authorizer is responsible for providing clearing transactions to provide authorization for making communication. The authorizer checks with a main data base within the central local node to determine whether the subscriber's credit is good and to what extent to ensure that service providers get paid. The data base may contain a history of the subscriber's usage and outstanding unpaid balance and other information relating to credit history. The main data base's information may be updated from information in other nodal data bases and vice versa, including that of the central node, which should contain the most current information and whose global authorizer may be responsible for authorizing all transactions in advance. By the same process, the global authorizer can check on the creditworthiness of service providers if the service providers will be responsible for paying each other.

The converters convert the form of the communication to suit the particular network over which the communication will be routed, e.g., voice into data, etc. The main processor and router is responsible for checking with the main data base to determine which service providers and communication networks to utilize and to access circuitry to compress or decompress the communications as needed and to access circuitry to code or decode the communications for security purposes.

The main processor and router route the communications through appropriate converters if necessary to suit the network being utilized for routing, i.e., internet, frame relay and ATM, or digital and analog voice lines. The main processor and router also direct the communication to the ultimate destination, i.e., access devices of the called party. In so doing, other central local nodes B or C may be used for part of the routing or else route directly to the access devices via the associated intercept if any for the access device. These intercept devices are also for directing communications.

Converters are available conventionally, such as Texas Instrument digital signal processors which convert voice to data and vice versa. Intercepts are available from VoiceSmart by ordering TLN or HLN and are available conventional from phone companies. The intercept may be part of or separate from the access devices. The intercept evaluates whether savings may be achieved by routing to a node and, if so, routes the transmission to the central local node A of FIG. 8 and identifies the subscriber and called party or service type.

The node receiving the routing from the intercept polls other nodes to trace the called party number or identification address. In this manner, the main processor and router of the node serves as an interrogator that interrogates the availability of the called party number or identification address. The node accesses a main data bank to check the communication network, call format and user preferences to determine the best connection between locations 150 and 156 of FIGS. 7A–7G. The node, through its authorizer, checks whether completing the routing of the transmission is authorized and obtains an authorization code from the global authorizer at the central node. The node converts the transmission if necessary for compatibility and records billing information to ensure proper end user billing. Also, the node updates user statistical usage and access for future use. Each of these tasks that are performed by the node are carried out in a manner that is transparent to the calling party.

Figure 9:
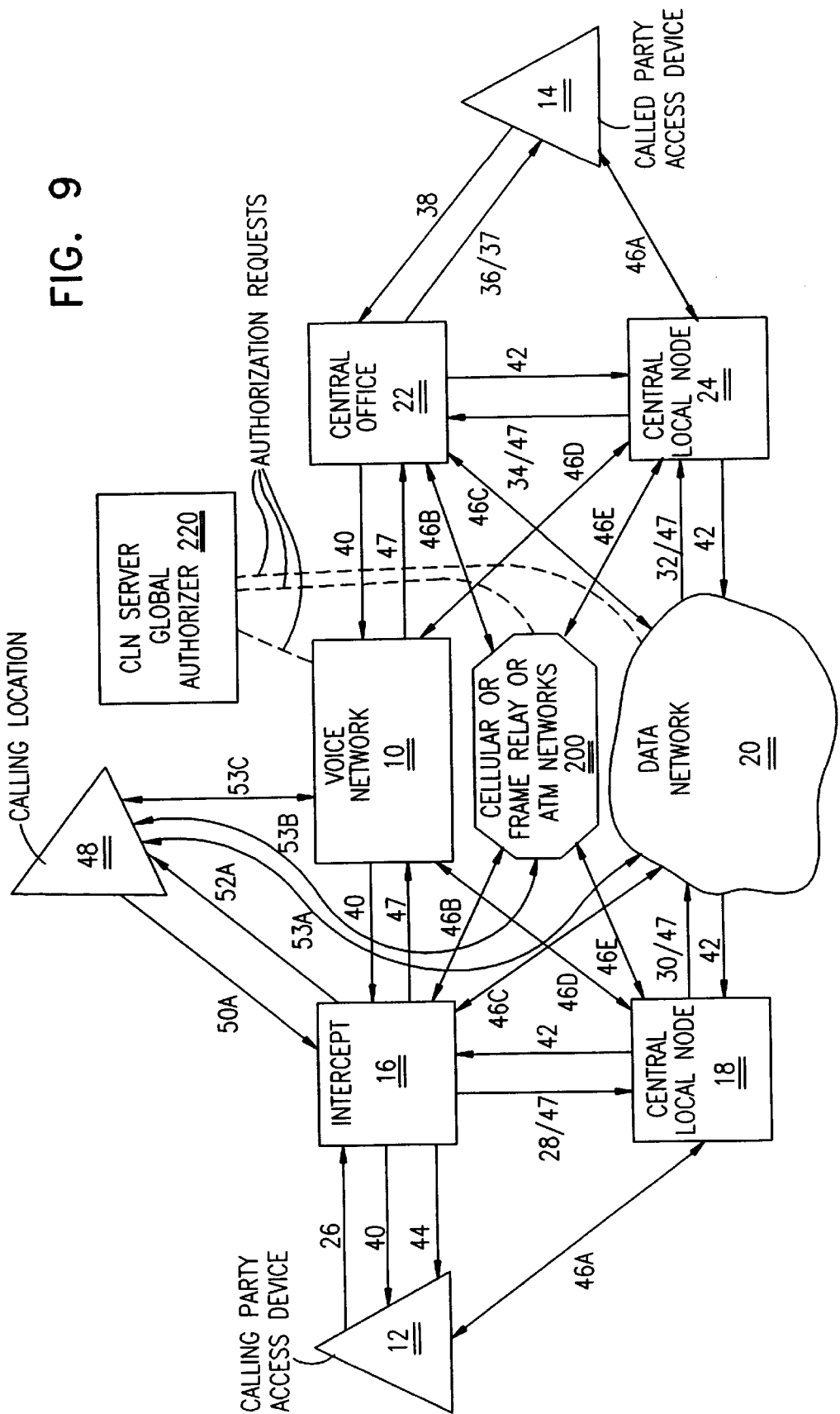
FIG. 9 is a conceptual block diagram that is a further variation of that of FIG. 1.

FIG. 9 is a variation of that of FIG. 1, but shares the same components that are identified by the same reference numerals. Additional two-way direct link connections 46A, 46B, 46C, 46D and 46E are included. For instance, one route for sending a request as to availability may be from the calling party access device 12 to the local access node 18 either directly or through the intercept 16 and then directly to either the communications network 10, the data network 20 or another network 200 such as a cellular network, ATM, and/or frame relay. The central switching unit 22 then receives the request from the network as to availability to check on the availability of the called party access device 14. Once the availability becomes known, an appropriate signal may be sent directly back to the central local node 18 either backtracking through the same route or through the second central local node 24 to either the communications network 10 or the data network 20 to thereafter reach the local access node 18. Note that the second central local node 24 may be considered a local access node for the called party access device 14.

A central local node global authorizer 220 is shown to which permission must be obtained by confirming authorization requests before routing connections between the calling and called parties may take place. This global authorizer 220 may be part of the central node to which all the central local nodes are in communication. In FIG. 8, for instance, the connection from the main data base to the other node data bases would include connection with the central node and thereby with this global authorizer. Authorization requests would be sent to the global authorizer 220 via the applicable one or more of the networks 10, 20, 200.

All the routing paths of FIGS. 7A to 7G are applicable to the block diagram of FIG. 9. Also, the representation of the interaction of the central local node with various networks as shown in FIG. 8 is applicable to FIGS. 1 and 9.

FIG. 9 shows some links as bidirectional lines and others as two single-directional lines in opposite directions. This was done for convenience and is in no way intended to be limited to one form or the other. Routes may be through any path available, except that the routing through links 53A, 53B and 53C only arises if calling location 48 communicates in a manner compatible with the applicable one of the networks 10, 20 or 200. Otherwise, routing will have to be done through the central local node 18.

If the calling party location uses a laptop computer and thus connects directly with the data network 20 and bypasses the central local node, the path of communication would still pass through either the central office 22 or the central local node 24 before reaching the called party access device 14. At the central office 22 or the central local node 24, therefore, the applicable billing information may be recorded.

While intercept 16 and central local node 18 are shown as separate units, they may be combined together. Similarly, while the central office 22 and central local node 24 are shown as separate units, they may be combined together. By being combined together, a unitary device would provide the functions of both.

While the foregoing description and drawings represent the preferred embodiments of the present invention, it will be understood that various changes and modifications may be made without departing from the spirit and scope of the present invention.

What is claimed is:

1. A method of use of a communication network, comprising the steps of:
    (a) receiving a calling party access number and a called party access number at a control location;
    (b) determininng which service providers service connections between said calling party access number and said called party access number;
    (c) comparing said service providers based on criteria;
    (d) selecting appropriate ones of said service providers that satisfy said criteria as a result of the step of comparing;
    (e) instructing said selected service providers to provide service between said connections for establishing contact between said calling party access number and said called party access number;
    (f) receiving a status signal at said control location indicating if said called party access number is available for taking an incoming communication;
    (g) if said status signal indicates an available status, initiating a first communication from said control location to said called party access number and a second communication from said control location to said calling party access number;
    (h) bridging said first and second communications.

2. A method as in claim 1, wherein said criteria includes any one of transmission quality, levels of security of transmission, cost for service by said service providers including peak and off-peak rates, types of communication routes available between said calling party access number and said called party, and historical record of quality of service provided by said service providers.

3. A method as in claim 1, wherein the steps of determining, comparing, selecting and instructing are carried out transparent to the calling party whose calling party access number was received.

4. A method of use of a communication network, comprising the steps of:
    (a) receiving a calling party access number and a called party access number at a control location;
    (b) receiving a status signal at said control location indicating if said called party access number is available for taking an incoming communication;
    (c) determining an expected time to communicate with the called party access number upon initiating a first communication thereto and determining the expected time to communicate with the calling party access number upon initiating a second communication thereto;
    (d) if said status signal indicates an available status, initiating one of a first communication from said control location to said called party access number and a second communication from said control location to said calling party access number to whichever of the first and second communication has the larger of said expected time before communication;
    (e) waiting for a time period to elapse that lasts at most as long as an amount of time equal to a difference in time between communication with the calling party access number and the called party access number; and
    (f) thereafter placing whichever of the other of the first and second calls has the shorter of said expected time before communication;
    (g) bridging said first and second communications.

5. A method as in claim 4, further comprising the step of blocking any incoming calls for a duration that lasts up to said difference in time.

6. A method as in claim 4, wherein the step of waiting is carried out based on checking with memory for information on the difference in time between communicating with said calling party access number and said called party access number, further comprising the step of sensing times when calls to said called party access number and to said calling party access number actually went through and updating said information in the memory based on results from the sensing.

7. An apparatus for use in a communication network, comprising an intercept that selects one route from among a plurality of different available routes in accordance with criteria pertaining to the routes, each of the routes passing through a control location and between a calling party access number and a called party access number, the intercept selecting the one route in a manner transparent to users of the calling party access number and the called party access number, the intercept further passing information with the control location in a manner transparent to users of the calling party access number and the called party access number, the intercept evaluating the information passed from the control location in a manner transparent to users of the calling party access number and the called party access number to ascertain whether to bridge calls through the selected one route between the calling party access number and the called party access number and, if so, instructing that calls between the calling party access number and the called party access number be bridged through the selected one route; wherein said intercept determines which service providers service connections between said calling party access number and said called party access number and compares said service providers based on criteria to select appropriate ones of said service providers that satisfy said criteria and to instruct said appropriate ones of selected service providers to provide instructions to effect said connections for establishing communication between said calling party access number and said called party access number.

8. A method of use of a communication network, comprising the steps of:
- (a) receiving a calling party access number and a called party access number,
- (b) in response to step (a), checking a status on each of a plurality of communication access locations each associated with said called party access number to determine which is accessible to reach said called party access number; wherein said communication access locations are each in connection with a different form of communication networks
- (c) based on the result of step (b), identifying the communication access location that was determined as being accessible steps (a) to (c) being carried out in a manner that is transparent to users of the calling party access number and the called party access number;
- (d) checking for authorization to allow communications through at least the identified access location;
- (e) routing, in response to said authorization being present, said communications through at least said identified access location; and
- (f) converting said communications through at least said identified access location from one form into another, said communication networks being incompatible with each other in an absence of said conversion.

9. A method of use of a communication network, comprising the steps of:
- (a) receiving a calling party access number and a called party access number,
- (b) in response to step (a), checking a status on each of a plurality of communication access locations each associated with said called party access number to determine which is accessible to reach said called party access number;
- (c) based on the result of step (b), identifying the communication access location that was determined as being accessible and making an indication that communication may become established with the called party access number, steps (a) to (c) being carried out in a manner that is transparent to users of the calling party access number and the called party access number;
- (d) commencing transmission of communications through a route to the identified one of said communication access locations based on the indication;
- (e) ascertaining a quality of the transmission over the route as said communications traverse said route; and
- (f) before completing the transmission commenced in step (d), changing the route over which the communications are transmitted in response to step (e) upon ascertaining that said quality degraded below a level of acceptability.

10. An apparatus for use in a communication network, comprising:
- a receiver of a called party access number;
- a checking device responsive to the receiver to check a status on each of a plurality of communication access locations each associated with said called party access number to determine which is suitable for reaching said called party access number;
- an identifying device responsive to the checking device to identify the communication access location that was determined as being accessible and making an indication that communication may become established;
- a commencing device responsive to said identifying device identifying said communication access location accessible for commencing transmission of communications over a route to said identified communication access location;
- a quality checking device that ascertains a quality of the transmission over the route as said communications traverse said route; and
- a route changer that changes the route over which the communications are transmitted in response to said quality checking device finding said quality degraded below a level of acceptability.

11. An apparatus for use in a communication network, comprising:
- a receiver of a called party access number;
- a checking device responsive to the receiver to check a status on each of a plurality of communication access locations each associated with said called party access number to determine which is suitable for reaching said called party access number, wherein said communication access locations are each in connection with a different form of communication network;
- an identifying device responsive to the checking device to identify the communication access location that was determined as being accessible and making an indication that communication may become established;
- an authorizer checking for authorization to allow communications through at least one of said access locations;
- a router responsive to said authorization being present to route said communications through at least an authorized one of said access locations; and
- a converter responsive to said indication for making a conversion of said communications through at least said authorized one of said communication access locations from one form into another, said communication networks being incompatible with each other in an absence of said conversion.

12. An apparatus as in claim 11, wherein said converter includes any one of compression circuitry and sampling circuitry.

13. An apparatus as in claim 11, wherein said checking device is part of a processor, further comprising encoding and decoding circuitry, said processor accessing said encoding and decoding circuitry to selectively code and decode said communication as appropriate.

14. A method of use of a communication network, comprising the steps of:
- (a) selecting one route with an intercept from among a plurality of different available routes in accordance with criteria pertaining to the routes, each of the routes passing through a control location and between a calling party access number and a called party access number, the step of selecting being carried out in a manner transparent to users of the calling party access number and the called party access number, the step of selecting comprising the step of:
  - (1) determining which service providers service connections between said calling party access number and said called party access number;
  - (2) comparing said service providers based on criteria; and
  - (3) selecting appropriate ones of said service providers that satisfy said criteria as a result of the step of comparing;
- (b) passing information between the intercept and the control location in a manner transparent to users of the calling party access number and the called party access number;

(c) evaluating said information in a manner transparent to users of the calling party access number and the called party access number so as to determine whether to bridge calls between the calling party access number and the called party access number through the selected route;

(d) in response to step (c) determining that the calls between the calling party access number and the called party access number are to be bridged through the selected route and instructing that the calls between the calling party access number and the called party access number be bridged through the selected one route, the step of instructing comprising the step of instructing said selected service providers to provide service between said connections for establishing contact between said calling party access number and said called party access number.

15. A method of use of a communication network, comprising the steps of:

(a) selecting one route with an intercept from among a plurality of different available routes in accordance with criteria pertaining to the routes, each of the routes passing through a control location and between a calling party access number and a called party access number, the step of selecting being carried out in a manner transparent to users of the calling party access number and the called party access number;

(b) passing information between the intercept and the control location in a manner transparent to users of the calling party access number and the called party access number;

(c) evaluating said information in a manner transparent to users of the calling party access number and the called party access number so as to determine whether to bridge calls between the calling party access number and the called party access number through the selected route;

(d) in response to step (c) determining that the calls between the calling party access number and the called party access number are to be bridged through the selected route, instructing that the calls between the calling party access number and the called party access number be bridged through the selected one route;

(e) determining an expected time to communicate with the called party access number upon placing a first call thereto and determining the expected time to communicate with the calling party access number upon placing a second call thereto;

(f) in response to completion of the step of determining, initially placing whichever of the first and second calls has the longer of said expected time before communication;

(g) waiting for a time period to elapse that lasts at most as long as said difference in time between communication with the calling party access number and the called party access number; and (h) thereafter placing whichever of the other of the first and second calls has the shorter of said expected time before communication.

16. A method of use of a communication network, comprising the steps of:

(a) receiving a calling party access number and a called party access number at a control location;

(b) determining which service providers service connections between said calling party access number and said called party access number;

(c) comparing said service providers based on criteria;

(d) selecting an appropriate service provider that satisfies said criteria as a result of the step of comparing;

(e) receiving a status signal at said control location indicating if said called party access number is available for taking an incoming communication;

(f) if said status signal indicates an available status, initiating a first communication from said control location to said called party access number and a second communication from said control location to said calling party access number at least one of the first or second communications being carried by the selected service provider; and (g) connecting said first and second communications.

* * * * *